United States Patent
Horsnell et al.

(10) Patent No.: US 12,373,350 B2
(45) Date of Patent: Jul. 29, 2025

(54) CACHE-LINE RETENTION HINT INFORMATION FOR CONDITIONAL WRITE INSTRUCTION

(71) Applicant: Arm Limited, Cambridge (GB)

(72) Inventors: Matthew James Horsnell, Cambridge (GB); Andreas Lars Sandberg, Cambridge (GB); Thomas Philip Speier, Wake Forest, NC (US); Robin Alexander Emery, Cambridge (GB); Eric Ola Harald Liljedahl, Stockholm (SE)

(73) Assignee: Arm Limited, Cambridge (GB)

( * ) Notice: Subject to any disclaimer, the term of this patent is extended or adjusted under 35 U.S.C. 154(b) by 22 days.

(21) Appl. No.: 18/394,400

(22) Filed: Dec. 22, 2023

(65) Prior Publication Data

US 2025/0209007 A1 Jun. 26, 2025

(51) Int. Cl.
*G06F 12/0875* (2016.01)
*G06F 9/30* (2018.01)

(52) U.S. Cl.
CPC ........ *G06F 12/0875* (2013.01); *G06F 9/3016* (2013.01); *G06F 2212/452* (2013.01)

(58) Field of Classification Search
CPC ............................ G06F 12/0875; G06F 9/3016
USPC ........................................................ 712/208
See application file for complete search history.

(56) References Cited

U.S. PATENT DOCUMENTS

| 5,561,783 A * | 10/1996 | Vanka ................ G06F 12/0804 711/143 |
| 10,761,987 B2 | 9/2020 | Jalal et al. |
| 2020/0142829 A1 | 5/2020 | Wang et al. |
| 2020/0201765 A1 | 6/2020 | Williams et al. |
| 2021/0306414 A1 | 9/2021 | Beard et al. |
| 2024/0202125 A1* | 6/2024 | Gholkar .............. G06F 12/0891 |

OTHER PUBLICATIONS

International Search Report and Written Opinion of the International Searching Authority for PCT/GB2024/052799 mailed Feb. 25, 2025, 15 pages.

* cited by examiner

*Primary Examiner* — Chun Kuan Lee
(74) *Attorney, Agent, or Firm* — NIXON & VANDERHYE P.C.

(57) ABSTRACT

In response to instruction decoding circuitry decoding a conditional write instruction, processing circuitry determines whether a predetermined condition is satisfied for a target cache line corresponding to a target address specified by the conditional write instruction. If the predetermined condition is satisfied for the target cache line, a write request is issued to update the target cache line. If the predetermined condition is not satisfied for the target cache line, a failure indication is returned. The processing circuitry selects, depending on whether the sequence of instructions specifies cache-line-retention hint information applicable to the conditional write instruction, whether to prevent a unique coherency state of the target cache line being relinquished by a local cache associated with the processing circuitry for a retention period following processing of the conditional write instruction. The unique coherency state comprises a coherency state in which the processing circuitry has exclusive right to update the target cache line.

19 Claims, 5 Drawing Sheets

CACHE-LINE RETENTION HINT INFORMATION FOR CONDITIONAL WRITE INSTRUCTION

BACKGROUND

Technical Field

The present technique relates to the field of data processing.

Technical Background

A conditional write instruction can be used to cause a write to a memory location to be performed conditionally, depending on whether a predetermined condition is satisfied. If the predetermined condition is not satisfied then the write does not occur. Such conditional write instructions can be useful, for example, for read/modify/write sequences which may need to be seen as being performed atomically when multiple threads or processors contend for access to a shared variable. The predetermined condition associated with the conditional write instruction can enable detection of whether a second thread has updated the variable between a first thread reading the variable and performing its write, and so can be used to determine whether the write should proceed to update the variable. The conditional write instruction can be included within a program loop which repeatedly attempts to perform a sequence including the conditional write instruction until the conditional write instruction succeeds.

SUMMARY

At least some examples of the present technique provide an apparatus comprising:
instruction decoding circuitry to decode a sequence of instructions; and
processing circuitry to perform data processing in response to decoding of the sequence of instructions by the instruction decoding circuitry; in which:
in response to the instruction decoding circuitry decoding a conditional write instruction, the processing circuitry is configured to:
determine whether a predetermined condition is satisfied for a target cache line corresponding to a target address specified by the conditional write instruction;
in response to determining that the predetermined condition is satisfied for the target cache line, issue a write request to update the target cache line; and
in response to determining that the predetermined condition is not satisfied for the target cache line, return a failure indication; and
select, depending on whether the sequence of instructions specifies cache-line-retention hint information applicable to the conditional write instruction, whether to prevent a unique coherency state of the target cache line being relinquished by a local cache associated with the processing circuitry for a retention period following processing of the conditional write instruction, the unique coherency state comprising a coherency state in which the processing circuitry has exclusive right to update the target cache line.

At least some examples of the present technique provide a non-transitory computer-readable medium to store computer-readable code for fabrication of an apparatus comprising:
instruction decoding circuitry to decode a sequence of instructions; and
processing circuitry to perform data processing in response to decoding of the sequence of instructions by the instruction decoding circuitry; in which:
in response to the instruction decoding circuitry decoding a conditional write instruction, the processing circuitry is configured to:
determine whether a predetermined condition is satisfied for a target cache line corresponding to a target address specified by the conditional write instruction;
in response to determining that the predetermined condition is satisfied for the target cache line, issue a write request to update the target cache line; and
in response to determining that the predetermined condition is not satisfied for the target cache line, return a failure indication; and
select, depending on whether the sequence of instructions specifies cache-line-retention hint information applicable to the conditional write instruction, whether to prevent a unique coherency state of the target cache line being relinquished by a local cache associated with the processing circuitry for a retention period following processing of the conditional write instruction, the unique coherency state comprising a coherency state in which the processing circuitry has exclusive right to update the target cache line.

At least some examples of the present technique provide a method comprising:
decoding a sequence of instructions; and
in response to decoding of the sequence of instructions, performing data processing using processing circuitry; in which:
in response to decoding of a conditional write instruction, the data processing comprises:
determining whether a predetermined condition is satisfied for a target cache line corresponding to a target address specified by the conditional write instruction;
in response to determining that the predetermined condition is satisfied for the target cache line, issuing a write request to update the target cache line; and
in response to determining that the predetermined condition is not satisfied for the target cache line, returning a failure indication; and
selecting, depending on whether the sequence of instructions specifies cache-line-retention hint information applicable to the conditional write instruction, whether to prevent a unique coherency state of the target cache line being relinquished by a local cache associated with the processing circuitry for a retention period following processing of the conditional write instruction, the unique coherency state comprising a coherency state in which the processing circuitry has exclusive right to update the target cache line.

Further aspects, features and advantages of the present technique will be apparent from the following description of examples, which is to be read in conjunction with the accompanying drawings.

DESCRIPTION OF EXAMPLES

Figure 1:
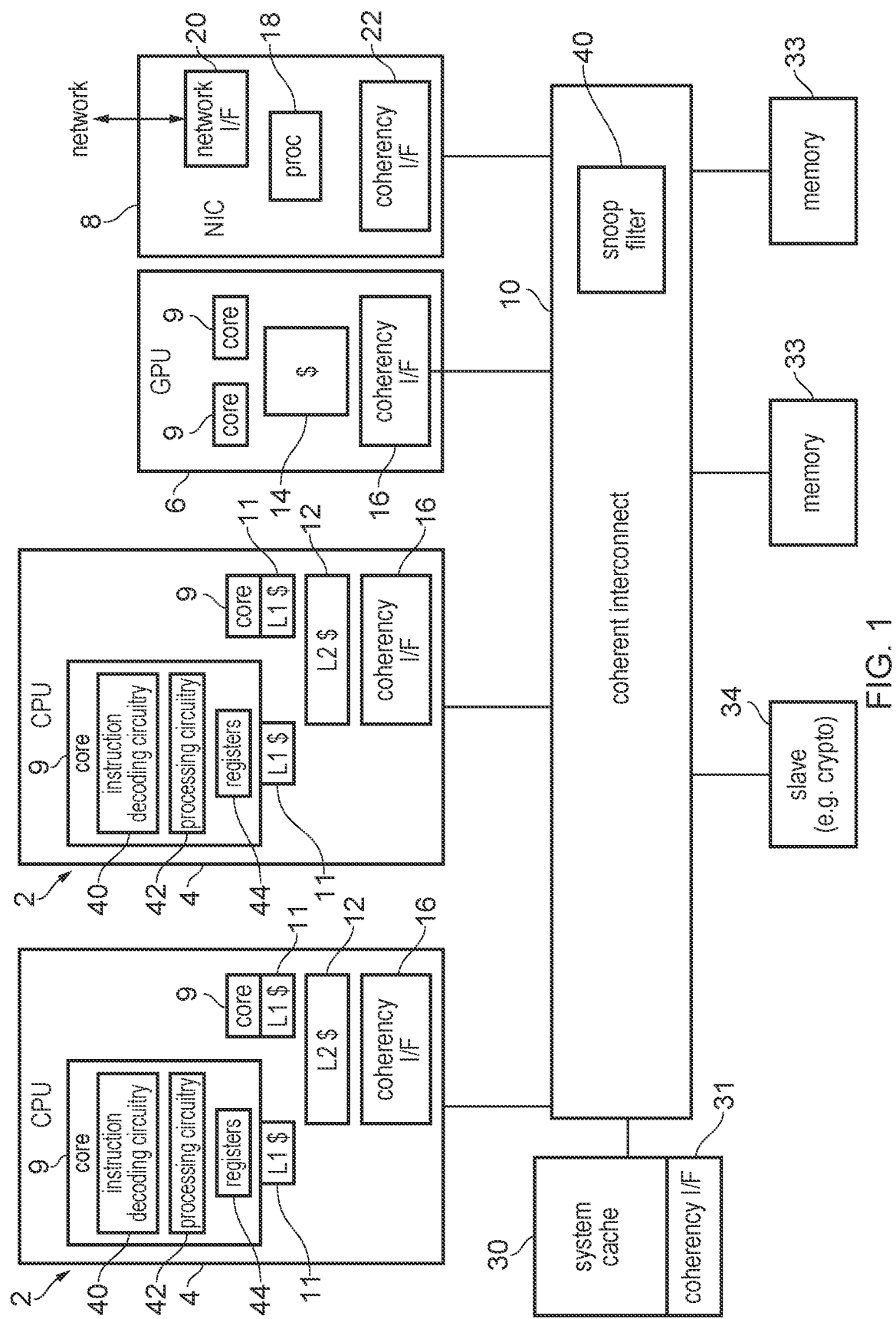
FIG. 1 illustrates an example of a data processing apparatus.

An apparatus has instruction decoding circuitry to decode a sequence of instructions, and processing circuitry to perform data processing in response to decoding of the sequence of instructions by the instruction decoding circuitry. In response to the instruction decoding circuitry decoding a conditional write instruction, processing circuitry determines whether a predetermined condition is satisfied for a target cache line corresponding to a target address specified by the conditional write instruction. If the predetermined condition is satisfied for the target cache line, a write request is issued to update the target cache line. If the predetermined condition is not satisfied for the target cache line, a failure indication is returned. The processing circuitry selects, depending on whether the sequence of instructions specifies cache-line-retention hint information applicable to the conditional write instruction, whether to prevent a unique coherency state of the target cache line being relinquished by a local cache associated with the processing circuitry for a retention period following processing of the conditional write instruction. The unique coherency state comprises a coherency state in which the processing circuitry has exclusive right to update the target cache line.

Hence, the processing circuitry has hardware supporting use of hint information, provided by software in the sequence of instructions being executed, to allow the processing circuitry to determine whether it may be beneficial to hold on to a target cache line in a unique coherency state for a period following processing of a conditional write instruction. This can be particularly useful following a failed attempt at executing a conditional write instruction to the target cache line. This can be useful for scenarios where the conditional write instruction is used as part of a read/modify/write sequence, because preventing the target cache line relinquishing the unique coherency state in the local cache for a period after a failed conditional write instruction can make it more likely that a subsequent attempt to execute the conditional write instruction may succeed, and reduce the chance of multiple contending threads (each executing a read/modify/write sequence associated with the same target cache line) collectively encountering significant delays due to the unique coherency status ping-ponging between respective local caches associated with processors executing the respective threads before any of those threads is able to complete the write. Nevertheless, although the prevention of relinquishment of the target cache line can be particularly useful following a failed conditional write instruction, it is not essential to make failure of the conditional write instruction a requirement for preventing relinquishment of the target cache line, and some implementations could also apply the retention period following a successful conditional write instruction.

Without the cache-line-retention hint information, it can be difficult for the processing circuitry to detect whether it is useful to retain the target cache line in the unique coherency state following the conditional write instruction, as the same type of instruction could also be used in other software use cases which do not involve such contention for access to the same cache line. In those other software use cases, retaining the target cache line in the unique coherency state for too long after a conditional write instruction could harm overall system performance if it blocks other threads from accessing the target cache line when the thread which encountered the conditional write instruction does not actually need the cache line for a long time after the conditional write instruction. Therefore, by providing processing circuitry which selects, based on whether the cache-line-retention hint information is included in the sequence of instructions including the conditional write instruction, whether to prevent the unique coherency state of the target cache line being relinquished for a period following the conditional write instruction being processed, this can support better system performance and provide a more flexible control of how caching of the target cache line is managed following a conditional write instruction, depending on the needs of the particular software use case in which the conditional write instruction is being executed.

The cache-line-retention hint information could be useful for a variety of types of conditional write instruction, which in general perform a write to a target cache line in memory conditional on a predetermined condition being satisfied, and return a failure indication (e.g. a storing a failure indication to a register, or setting condition status codes to a particular value) if the predetermined condition is not satisfied.

However, the cache-line-retention hint information can be particularly useful where the conditional write instruction itself involves a request to bring the target cache line into the local cache in the unique coherency state (or at least where the conditional write instruction is expected to be used in a software instruction sequence where a previous instruction preceding the conditional write instruction is likely to have caused the processing circuitry to bring the target cache line into the local cache in the unique coherency state).

One particular example of such a conditional write instruction may be a compare-and-swap (CAS) instruction, which specifies a target address, a compare operand and a swap operand. In response to the CAS instruction, the processing circuitry determines whether the predetermined condition is satisfied based on a comparison of the compare operand with a value loaded for the target cache line corresponding to the target address. If the predetermined condition is satisfied, the processing circuitry issues a write request to write the swap operand to the target cache line. The cache-line-retention hint information can be particularly useful for such a CAS instruction because the load of the value to be compared with the compare operand to evaluate the predetermined condition may be relatively likely to cause the target cache line to be brought into the local cache in the unique coherency state (to prepare for a subsequent write to the target cache line if the comparison meets the predetermined condition), and because such CAS instructions are commonly used in read/modify/write sequences which may need to be observed as executing atomically when multiple threads are contending for applying such sequences to the same cache line in memory.

During the retention period, the processing circuitry may prevent the unique coherency state of the target cache line being relinquished by delaying responding to snoop requests relating to the target cache line until after the end of the retention period. If a response to such snoop requests is delayed until after the end of the retention period, this will prevent another thread executing on another processor being able to complete the write to the target cache line during the retention period, giving the thread executing on the processor having the local cache which is preventing relinquishment of the unique coherency state more time to perform its write of the read/modify/write sequence while the line is held in the unique coherency state.

The cache-line-retention hint information could be encoded in a number of different ways. In general, the processing circuitry selects whether to prevent relinquishment of the unique coherency state for the target cache line during the retention period following a failed conditional write instruction, based on whether the sequence of instructions including that conditional write instruction specifies the cache-line-retention hint information applicable to that conditional write instruction.

In some implementations, the processing circuitry may select that the unique coherency state should be prevented from being relinquished for a period following the conditional write instruction in cases where the cache-line-retention hint information applicable to that conditional write instruction is absent from the sequence of instructions, and allow relinquishment of the unique coherency state during that period following the conditional write instruction in cases where the cache-line-retention hint information applicable to that conditional write instruction is present in the sequence of instructions. In this case, the default behaviour may be to resist relinquishment of the unique coherency state for the target cache line following a conditional write to that cache line, unless applicable hint information is detected as being present in the sequence of instructions. If the hint information is present, then the unique coherency state of the target cache line may be allowed to be relinquished earlier, before the end of the retention period. This approach could be useful if it is expected that, in the majority of software use cases, the conditional write instruction (e.g. a CAS instruction) is expected to be used in a scenario (e.g. read/modify/write) where it could be useful to resist giving up the unique coherency state for a time after the conditional write, with the hint information indicating the departure from this default where it is considered better to allow the unique coherency state to be relinquished earlier if another processor requires the same cache line.

However, in other implementations the default approach to be taken in absence of the hint information may be the opposite. The processing circuitry may select that the unique coherency state should be prevented from being relinquished for a period following the conditional write instruction in cases where the cache-line-retention hint information applicable to that conditional write instruction is present in the sequence of instructions, and allow relinquishment of the unique coherency state during the period following the conditional write instruction in cases where the cache-line-retention hint information applicable to that conditional write instruction is absent from the sequence of instructions. This approach can have advantages in that it may be easier in micro-architecture to trigger the enforced retention of the target cache line based on a hint explicitly included in the sequence of instructions, and also because this can support the option of defining further attributes in the hint information which may influence the way in which the processing circuitry manages the period for which relinquishment of the unique coherency state is prevented.

The presence/absence of the cache-line-retention hint information may not be the only condition which determines whether the processing circuitry should prevent the unique coherency state of the target cache line being relinquished for the retention period following processing of the conditional write instruction which failed its return condition. There could also be other conditions which are applied, such as whether the processing circuitry is executing in a particular mode, or micro-architecture-dependent conditions such as whether one or more metrics determined based on current utilisation of the local cache satisfy certain criteria.

In some examples, the cache-line-retention hint information, if present, could be encoded by the conditional write instruction itself. Hence, at least one of the instruction decoding circuitry and the processing circuitry may detect whether the sequence of instructions specifies the cache-line-retention hint information based on whether the conditional write instruction specifies the cache-line-retention hint information. For example, the conditional write instruction could specify the cache-line-retention hint information using various parameters of the instruction. For example, an opcode of the instruction could indicate the presence or absence of the cache-line-retention hint information. Two or more variants of the conditional write instruction may be supported (e.g. distinguished by different opcodes), with those variants each triggering the same functional operation, but some of those variants being considered to encode the presence of the cache-line-retention hint information and other variants being considered to encode the absence of the cache-line-retention hint information. Alternatively, another field of the instruction encoding separate from the opcode can be used to signal whether the cache-line-retention hint information is present or absent. Another option can be that a register operand (a value stored in a register referenced by a register specifier encoded in the instruction) can specify whether the cache-line-retention hint information is present or absent. This register operand could be a separate operand from any other operands affecting the architecturally-defined functional operation of the conditional write instruction itself (e.g. for a CAS instruction, the hint register operand could be separate from register operands used to provide the compare operand, the swap operand and/or address operand defining the target address). Alternatively, one of the existing operands of the conditional write instruction could have some spare bits not currently used for meaningful purposes, and these bits could be reused to encode whether the cache-line-retention hint information is present or absent. For example, an address operand of the conditional instruction may be specified as a register operand using a register with a given number of bits (e.g. 64 bits), but the actual memory space in use may span an address range that does not require the full number of bits in the register to be able to encode every address in that range (e.g. less than 64 bits may be sufficient to encode all addresses in the actual memory space in use). Therefore, the address operand register may include some spare bits that can be used to encode the presence/absence of the cache-line-retention hint information (and if the hint is present, can be used to encode any other information specified by the hint, such as applicability conditions governing whether the hint is applicable to a subsequent conditional write instruction, or an indication of retention period duration). Hence, there can be a variety of ways in which the conditional write instruction itself could be encoded to specify the cache-line-retention hint information.

Alternatively, in other examples the cache-line-retention hint information could be encoded by a separate instruction from the conditional write instruction. Hence, at least one of the instruction decoding circuitry and the processing circuitry may detect whether the sequence of instructions specifies the cache-line-retention hint information based on whether an earlier instruction than the conditional write instruction specifies the cache-line-retention hint information. That earlier instruction could be a dedicated hint instruction (e.g. an instruction which behaves as an architectural no-operation (NOP) instruction, so causes no change in architectural state—the effect of the hint being to control micro-architecture to determine whether to resist relinquishment of the unique coherency state). Alternatively, the earlier instruction could be an instruction which also triggers a particular architectural operation so that it can cause a change in architectural state (e.g. a change in the values associated with architectural registers of the processing circuitry). For example, a variant of an existing type of instruction (expected to be commonly used in sequences of the type likely to benefit from the hint) could be provided which, in addition to that instruction's normal function, also signals the cache-line-retention hint information. Providing a dedicated hint instruction or repurposing an existing instruction other than the conditional write instruction itself could be useful if there is insufficient encoding space in the conditional write instruction to encode the cache-line-retention hint information.

Although the earlier instruction which encodes the cache-line-retention hint information could be a wide variety of instructions (including a dedicated software hint instruction with no specific architectural functionality), one particular option which could be useful is to use a particular variant of a CAS (compare-and-swap) instruction to indicate the hint. The CAS instruction may specify a given address, a compare operand and a swap operand and may cause the processing circuitry to compare the compare operand with a value loaded for a given cache line corresponding to the given address, and in response to determining that a comparison condition is satisfied in the comparison of the compare operand with the loaded value, write the swap operand to a given cache line corresponding to the given address. An instance of the CAS instruction for which the compare operand equals the swap operand may be treated as the earlier instruction encoding the cache-line-retention hint information. A CAS instruction with the compare operand equal to the swap operand is referred to as an "identity CAS instruction" below for conciseness. Using an identity CAS instruction to convey the hint can be particularly useful because it means there is no need to consume any additional instruction encoding space to support the hint, as the existing instruction encoding format of a CAS instruction can be used. Instead, the hint's presence or absence can be detected based on identification of the compare operand and swap operand. Hence, the conditional write instruction which benefits from the presence of the hint may be a "true" CAS instruction with a compare operand equal to the swap operand, but the presence of the hint may be encoded using an identity CAS instruction preceding the true CAS instruction in the sequence of instructions.

Whether the compare operand equals the swap operand could be detected from a comparison of register specifiers (e.g. the hint may be considered present if both compare operand and swap operand are specified using the same register specifier)—in this case an "identity CAS instruction" would comprise an instruction for which the register fields for the compare and swap operands both specify the same register (an instruction which uses different registers to indicate the compare and swap operands may not be treated as an identity CAS even if the values stored in those registers happened to be the same). Alternatively, the comparison between the compare operand and the swap operand could be performed based on the actual value stored in the registers used to reference these operands, in which case the CAS instruction could be treated as an identity CAS instruction even if different registers are used for the compare operand and swap operand respectively. In practice, however, it may be more reliable for software to signal that the hint should be present by encoding the same register specifier for both the compare operand and the swap operand, than to rely on particular values stored in the registers (which might depend on earlier instructions). Also, comparison of register specifiers may require fewer bits to be compared than comparison of the values stored in the registers.

Regardless of how the processing circuitry determines whether the compare operand equals the swap operand (based on register specifier comparisons or based on the operand values stored in the registers), it can be relatively unlikely that the compare operand and the swap operand would be equal to each other in a normal use of a CAS instruction, as normally such instructions are used in scenarios where the value stored in memory needs to be modified from its current value dependent on the memory location still having its current value, so as the compare operand may express the expected current value and the swap operand may express the modified value to be written to memory if the comparison condition passes, it is very likely that in normal use cases the compare operand and swap operand would be different. Therefore, encodings of the instruction where the compare operand and swap operand are the same are likely to be redundant and can be repurposed to represent the cache-line-retention hint information.

Another advantage of using an identity CAS instruction to encode the hint is that it may be common for a CAS instruction, which needs to load a value for the given cache line for comparison with the compare operand, to also have a side-effect of causing the given cache line to be held in the local cache of the processing circuitry in the unique coherency state. Hence, as well as encoding the hint that it could be useful to avoid relinquishing the unique coherency state for a time after a failed conditional write instruction, executing an identity CAS instruction can also increase the probability that the conditional write instruction succeeds on its first attempt due to the identity CAS instruction used as the hint having caused the line to be brought into the local cache in the unique coherency state. In some cases, the identity CAS instruction might itself trigger the retention period during which the cache line specified by the identity CAS instruction is prevented from relinquishing its unique coherency state in the local cache.

Nevertheless, other encodings of the hint are also possible, and an identity CAS instruction is not the only option.

Where the cache-line-retention hint information is encoded in an earlier instruction than the conditional write instruction, it may be undesirable for that hint information to be applied indefinitely to all subsequent instructions, as this could cause other threads contending for the target cache line to be denied opportunity at making forward progress. Hence, the cache-line-retention hint information may be considered applicable to the conditional write instruction when the earlier instruction specifies the cache-line-retention hint information and no instance of a hint-cancelling event has occurred between the earlier instruction and the conditional write instruction. If a hint-cancelling event occurs between the earlier instruction and the conditional write instruction, then the hint is no longer applicable to the conditional write instruction.

There could be a wide variety of events which could be regarded as a hint-cancelling event, depending on the micro-architectural design choices implemented in a given system. For example, the hint-cancelling event could comprise one of:

- an exception being taken. If an exception is taken then the processing circuitry may be switching to another set of instructions unrelated to the thread which included the conditional write instruction, so there is no longer a benefit in holding on to the target cache line in the unique coherency state and overall system performance may be improved by re-enabling the option of the local cache of the processing circuitry relinquishing the unique coherency state of the target cache line, so that threads at other processors contending for that cache line can make some forward progress.
- the predetermined condition being determined to be satisfied for another conditional write instruction occurring between the earlier instruction and the conditional write instruction. Once a conditional write instruction has succeeded following the hint, then it may be deemed that the benefit of the hint is no longer applicable as the software has already made the required forward progress that the hint was aiming to accelerate.
- another conditional write instruction being detected as specifying an address of a different cache line to the target cache line. If a conditional write is detected to a different cache to the target cache line, then again this may indicate that program flow has left the loop that was attempting a conditional write to the target cache line, so it may be preferable to allow the unique coherency state of the target cache line to be relinquished so that other threads can make progress if they need to write that cache line.
- eviction of the target cache line from the local cache. In some cases, for cache capacity reasons, the target cache line might be selected to be evicted from the cache even before any conditional write instruction targeting that cache line has been reached (and regardless of whether there was any external contention for that cache line with other processors—the cache capacity based eviction may have been triggered by local accesses to other cache lines issued by the processing circuitry). If the target cache line is no longer held in the local cache, there may no longer be any benefit to delaying responses to snoops for the target cache line, and so the hint may be considered no longer applicable to subsequent conditional write instructions.
- a hardware counter timeout event. For example, the hardware counter timeout event may occur when a counter, which is configured to count instances of a particular hardware event since the hint was detected, reaches a particular threshold (e.g. zero or a particular non-zero threshold value). For example, the hardware event could comprise the elapse of one or more processing cycles since the previous hardware event, the execution of a predetermined number of committed instructions since the previous hardware event, or the execution of a predetermined number of committed load/store instructions since the previous hardware event. In general, it can be useful to apply a certain maximum bound on the period for which the hint remains applicable, as the longer the period between the hint being encountered and the conditional write instruction being encountered, the lower the probability that the hint is still relevant.

A given implementation may support any one or more of these types of hardware event.

In some examples, at least when the conditional write instruction comprises the compare-and-swap (CAS) instruction for which the compare operand differs from the swap operand, the processing circuitry may determine that the cache-line-retention hint information is applicable to the conditional write instruction when the predetermined condition is not satisfied for the conditional write instruction, but determine that the cache-line-retention hint information is not applicable to the conditional write instruction when the predetermined condition is satisfied for the conditional write instruction. This recognises that the prevention of relinquishment of the unique coherency status based on the hint can be more useful following a failed "true" CAS instruction than following a successful true CAS instruction, because the true CAS instruction has successfully managed to update memory and so the sequence of instructions is less likely to request another write to that cache line soon, so it may be better for performance following a successful true CAS instruction to allow the unique status of the target cache line to be relinquished if necessary based on accesses from other requesters. Therefore, it could be preferable that the hint is not considered applicable to a subsequent successful CAS instruction. On the other hand, for failed CAS instructions the hint can be more beneficial as there is a likelihood that a subsequent retry of the failed CAS would benefit from the hint if it can be retried during the retention period when the local cache has resisted attempts to relinquish the unique coherency state of the target cache line.

On the other hand, in an implementation which uses an identity CAS as the hint information, it can be beneficial to apply the retention period for a time after the identity CAS even when the predetermined condition is satisfied. Hence, the hint applicability to a given CAS may not depend on success/failure of the CAS's predetermined condition, when the given CAS is an identity CAS.

In some examples, the cache-line-retention hint information may either be present or absent but may not specify any further information about the hint.

However, in some examples it can be useful for the cache-line-retention hint information to also specify other information defining one or more conditions governing the way in which the hint is to be applied or how the retention period is to be managed for a conditional write instruction. For example, the processing circuitry may determine whether the cache-line-retention hint information is applicable to the conditional write instruction depending on whether at least one applicability condition specified by the cache-line-retention hint information is satisfied for the conditional write instruction. This can allow the software developer or compiler to express more precisely the conditions in which a subsequent conditional write instruction is likely to benefit from the hint or not, which can help improve system performance by enabling the processing circuitry to make decisions on retention of the target cache line which more carefully balance the needs of the thread including the hint against the needs of other threads which may be contending for access to the same cache line.

The applicability condition(s) could be specified in a variety of different ways by the cache-line-retention hint information.

In some examples, the at least one applicability condition specifies a threshold number of intervening instructions; and the processing circuitry determines that the cache-line-retention hint information is not applicable to the conditional write instruction when a number of intervening instructions between an earlier instruction specifying the cache-line-retention hint information and the conditional write instruction is greater than the threshold number. Again, this recognises that the larger the distance between the hint and the conditional write instruction, the more likely it is that other threads may be harmed in performance to a greater extent than the performance gain predicted for the thread involving the hint, and so it may be desired to limit the maximum distance between instructions for which the hint information remains applicable.

In some examples, the at least one applicability condition specifies at least one branch outcome condition, and the processing circuitry may determine that the cache-line-retention hint information is not applicable to the conditional write instruction when a pattern of branch outcomes of one or more branch instructions preceding the conditional write instruction fail to satisfy the at least one branch outcome condition. In some examples, there could be a number of alternative routes through a sequence of code and so the branch outcome pattern (e.g. sequence of not-taken/taken outcomes for a series of successive branches) may be used to determine whether the hint is still considered beneficial. For example, the hint may be considered beneficial if the branch outcome pattern represents a pattern expected for the common case where the read/modify/write sequence does not encounter any out-of-ordinary error conditions, but the sequence may also include at least one error checking branch partway through the sequence which conditionally branches away from the read/modify/write sequence depending on whether an error condition is identified, and if such branches are taken that may indicate that any subsequent conditional write instruction is no longer the conditional write instruction for which the hint was designed to be applicable. Hence, considering branch patterns in determining hint applicability can reduce the likelihood that the target cache line is retained in the local cache for too long in the unique coherency state when the thread associated with that local cache cannot benefit from that cache line and other threads could make progress faster if the unique coherency state was relinquished sooner.

In scenarios where the target cache line is prevented from relinquishing its unique coherency state during the retention period following the conditional write instruction, the processing circuitry can control the duration of the retention period in a number of different ways.

For example, the processing circuitry may end the retention period in response to a hardware counter timeout event occurring after processing of the conditional write instruction. As for the hardware counter timeout event mentioned above for determining hint applicability, the hardware counter timeout event can be based on whether a counter reaches a threshold, with that counter being advanced in response to detection of instances of a particular hardware event (e.g. elapse of predetermined number of processing cycles, execution of a predetermined number of committed instructions, or processing of a predetermined number of load/store operations). For the monitoring of the retention period end the counter may be initialised in response to the conditional write instruction, rather than in response to the hint being detected.

There can be a trade-off in setting the duration of the retention period, where a longer retention period may benefit the thread that is associated with the local cache holding on to the target cache line in the unique coherency state but may harm performance for other threads, while a shorter retention period reduces the likelihood the thread associated with the local cache can make progress on the next iteration of attempting the conditional write but reduces impact on other threads.

In some examples the retention period may have a certain fixed duration (which could be counted in terms of number of elapsed processing cycles, number of executed/committed instructions or number of executed load/store operations as mentioned above). The hardware micro-architecture designer may choose a particular maximum length of retention period which is applied in the cases where, based on the presence/absence of hint, the processing circuitry determines to retain the target cache line in the unique coherency state for a time after processing of a conditional write instruction.

However, other examples may support a retention period of variable duration. The processing circuitry may end the retention period after elapse of a period of variable duration selected based on retention period duration information specified by the cache-line-retention hint information. For example, the retention period duration information may select between a number of preconfigured duration options (e.g. short/medium/long . . . ) or could specify a particular value to be initialised on the counter tracking the hardware counter timeout event or a particular value for the threshold at which the counter is considered to expire triggering the hardware counter timeout event. By allowing software-specified information defining retention period duration to influence the duration of the retention period, the software can indicate whether a longer or shorter period of retention for the target cache line is predicted to be more beneficial for performance, and the hardware can use this hint to select the duration of retention period applied.

Also, regardless of whether or not the cache-line-retention hint information specifies retention period duration information, the retention period could also be terminated by the processing circuitry if a particular retention period reset event occurs. The retention period reset event could, for example, comprise one of:

an exception being taken;
the predetermined condition being determined to be satisfied for another conditional write instruction occurring after the conditional write instruction;
another conditional write instruction being detected as specifying an address of a different cache line to the target cache line;
eviction of the target cache line from the local cache; or
a hardware counter timeout event.

These types of retention period reset event can be useful for terminating the retention period for similar reasons to those given above for the corresponding types of hint-cancelling event. A given implementation may support any one or more of these types of retention period reset event.

In some examples, during the retention period, other parts of the system may be unaware that the processing circuitry is resisting attempts to cause relinquishment of the unique coherency state for the target cache line, and so may continue to send snoop requests relating to the target cache line.

However, in other examples the processing circuitry may, based on the hint expressed by software in the sequence of instructions being executed, also provide hint information to other parts the processing system. For example, the processing circuitry may provide a retention hint signal to coherency control circuitry responsible for managing coherency between the local cache and a further cache, the retention hint signal indicating that the local cache would not relinquish the unique coherency state during the retention period. This could allow other parts of the system (e.g. the coherency control circuitry itself or another processor associated with the further cache) to change their operations, e.g. to prioritise (if possible) processing of requests involving cache lines other than the target cache line during the period when the processing circuitry would prevent the local cache relinquishing the unique coherency state for the target cache line. This could allow threads at other processors, for example, to make better forward progress by prioritising request bandwidth on requests for cache lines more likely to be available. Similarly, the processing circuitry may support a retention hint end signal which communicates to the coherency control circuitry that the retention period has ended and so the local cache may once more be able to relinquish the unique coherency state for the target cache line associated with the conditional write instruction.

FIG. 1 schematically illustrates an example of a data processing system 2 (e.g. an integrated circuit or system-on-chip) which includes a number of requester devices 4, 6, 8 and an interconnect 10 for managing coherency between the requester devices and other caches. In this example the requester devices include one or more central processing units (CPUs) 4 for performing general purpose processing, a graphics processing unit (GPU) 6 for performing graphics processing and a network interface controller (NIC) 8 for controlling transmission and reception of data over a network. The CPU and GPU include caches 11, 12, 14, e.g. level 1 caches associated with particular cores 9 and a shared level 2 cache 12 for the CPU or a shared cache 14 for the GPU (in practice, the cores 9 of the GPU could also have individual caches). The NIC 8 has processing circuitry 18 for controlling network packet transmission and reception, and a network interface 20 for transmitting the packets to the network and receiving packets from the network. Each of the requester devices 4, 6, 8 has a coherency interface 16, 22 for interacting with the coherent interconnect. For example, the coherency interface 16, 22 may be responsible for generating the required coherency protocol transactions in response to memory/cache accesses from the relevant requester, and responding to snoop requests from the interconnect 10 with appropriate responses and changes of coherency state. It will be appreciated that this is just one example of some requester devices and other types of requesters could also be provided, such as display controllers for controlling display of data on a screen, or a DMA (direct memory access) controller for controlling transfer of data between memory and a peripheral device for example. Examples of coherency protocols which could be used are the AMBA® 4 ACE and AMBA® 5 CHI coherency protocols provided by ARM® Ltd of Cambridge, UK, but it will be appreciated that the techniques discussed herein could also be applied to other coherency protocols.

A given core 9 within a CPU on GPU may include instruction decoding circuitry 40 for decoding instructions of a sequence of instructions to be executed, processing circuitry 42 for executing processing operations in response to the decoded instructions, and registers 44 for storing operands for the instructions and results of processing operations performed by the processing circuitry 42.

A system cache 30 is coupled to the coherent interconnect 10 but not assigned to a particular requester device. The system cache 30 may, for example, be provided to speed up access to data by uncached requesters such as the NIC 8, allowing faster access than if all reads and writes from the NIC 8 have to be served by main memory 33. The system cache 30 has a coherency interface 31 for responding to snoop requests or linefills of data from the coherent interconnect. The interconnect may also be coupled to other types of device 34, such as a cryptographic unit for providing cryptographic support to operations performed on the requester devices.

As shown in FIG. 1, the coherent interconnect 10 may include a snoop filter 40 for tracking which data addresses are cached at certain requester devices 4, 6. The snoop filter 40 can be used to reduce snoop traffic by allowing the coherent interconnect 10 to determine when data is not cached at a particular requester. The snoop filter 40 is not essential, and in some embodiments may provide an interconnect 10 which does not attempt to track the data cached at each requester. In this case, when one requester 4, 6, 8 issues a read or write transaction to data which could be shared with other requesters, the coherent interconnect 10 may trigger snoop transactions to be issued to each other requester which could have a cached copy of the data from the same address, and manage changes in coherency state at those other requesters and/or responses to the requesting requester with more up to date versions of the data as necessary. However, if there are a lot of requesters, then this approach of broadcasting snoops to all cached requesters can be complex and result in a large volume of coherency traffic being exchanged within the system 2.

By providing a snoop filter 40 which can at least partially track which addresses are cached at the respective requesters, this can help to reduce the volume of snoop traffic. In some cases the snoop filter 40 may precisely track the data stored in each requester's cache, so that the coherent interconnect 10 can determine exactly which data is cached where. Hence, when a transaction is received from an initiating requester directed to potentially shareable data then the interconnect 10 can determine from the content of the snoop filter 40 which other requesters are caching data from the same address and send snoop transactions to those requesters indicated in the snoop filter, avoiding the need to send snoops to other requesters which are not currently storing the data.

However, other snoop filters may not track the content of the caches precisely. For example, a filter scheme may be used which ensures that the snoop filter 40 avoids false negatives, ensuring that any data which is present in the caches 11, 12, 14 is logged as present in the snoop filter, but which permits some false positives, so that sometimes the snoop filter 40 may indicate that data is cached in a given requester, but actually the requester has already invalidated the data. This approach of allowing some imprecision can reduce the overhead of updating the snoop filter as it means that not every invalidation from the requester's cache 11, 12, 14 has to be reflected at the snoop filter.

In some examples the system cache 30 and snoop filter 40 may be combined, with a single structure looked up based on an address to provide both cached data and snoop filter information associated with that address.

Figure 2:
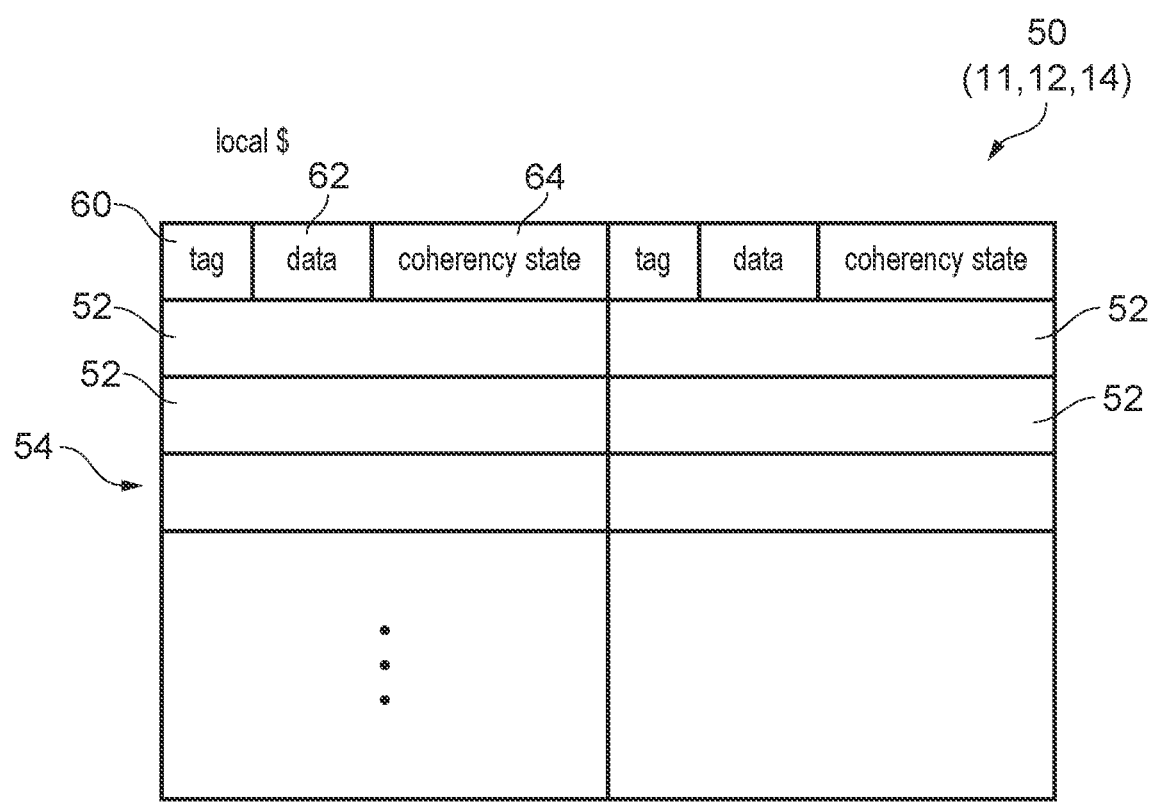
FIG. 2 illustrates an example of a cache.

FIG. 2 illustrates an example of a local cache 50 (e.g. any of caches 11, 12, 14 shown in FIG. 1) which may be associated with processing circuitry 42 in in a given core 9.

The local cache is one of the caches for which coherency is managed by the coherent interconnect 10 (an example of coherency control circuitry). The cache 50 includes a number of cache entries 52 for caching data obtained from memory 33 (in this context, "data" may include any cached information including not only functional data, but also executable program instructions). The cache 50 may, for example, have a set-associative structure comprising a number of sets 54 of entries, each set 54 comprising two or more entries 52, with the data for a particular address being allocated to one of the entries 52 in the set 54 that corresponds to that address. FIG. 2 shows a two-way set-associative structure, but other examples could have a different associativity or could be fully-associative or direct-mapped. Each entry 52 may specify, for example, a cache tag 60 derived from at least a portion of the address of the cache data (for use in determining on a cache lookup whether the data in that entry 52 relates to the address for which the lookup is performed), the cached data 62 itself, and a coherency state 64 associated with the cached data 62 (it will be appreciated that other information can also be stored in each entry 52). The coherency protocol implemented by the coherent interconnect 10 and caches may define rules for how various classes of accesses (e.g. various types of read, write and snoop accesses) to the cache are to be handled, based on the current coherency state of the cached data. A given type of request may trigger transitions of coherency state 64 in local caches 11, 12, 14 based on the type of request being performed and the coherency states of the cache line targeted by the request in the various local caches 11, 12, 14.

Each cache entry 52 can therefore cache data 62 for a given cache line of the memory address space used to address the memory 33. Here, the term "cache line" refers to a unit of address space of a certain size. The coherency protocol applied by the coherent interconnect tracks coherency status at granularity of cache lines.

One of the coherency states supported for a given cache line held in the local cache 50 may be a "unique" coherency state. When a cache line is held in a local cache 50 in the unique coherency state, this means that the processing circuitry 42 associated with that local cache 50 has the unique right to write to that cache line, and can do so without first checking with the interconnect 10 or other requesters that might hold the line. Before another requester device can write to that cache line, it would issue a request to the coherent interconnect 10 that triggers a snoop request to the local cache 50 holding the cache line in the unique state, to request that the unique coherency state is relinquished by that local cache.

In systems such as the example apparatus shown in FIG. 1, "composite operation single-word atomics" are typically implemented in software using a sequence of instructions including a load of a value, some comparison and logic operations, and then a write of a modified value back to the same address, if and only if the value in memory for that address is still the same as the value initially loaded. This final test and commit is typically done with a conditional write instruction such as a compare-and-swap (CAS) instruction.

When multiple processing elements (PEs, e.g. the cores 9 shown in FIG. 1) attempt these operations, only one will succeed; the one who reaches the committing CAS first (first-to-store property), while the value in memory remains unchanged since the initial load.

As a trivial example, imagine we would like to do the following operation atomically (if the value at addrA is greater than 0, decrement that value), with multiple threads trying to do that operation on the same address concurrently:
   if memory[addrA]>0 {memory[addrA]--;}

This could be implemented as an atomic read/modify/write sequence using, for example, the following sequence of instructions:

```
ldar x1, [addrA]        // load value for addrA to register x1
retry:
cmp x1, <0>             //compare loaded value with 0
ble <skip>              //branch to "skip" if loaded value = 0
mov x4, x1              //preserve loaded value in reg x4
sub x2, x1, #1          //subtract 1 from loaded value
casal x1, x2, [addrA]   //CAS with x1 as compare operand and
                        //x2 as swap operand, conditionally writes the
                        //value in x2 to addrA dependent on loaded value
                        // matching compare operand, and also writes the
                        // loaded value into x1
cmp x1, x4              // does value loaded by CAS from addrA match
                        //originally loaded value?
bne <retry>             //if mismatch between originally value and //value
                        loaded by CAS, branch back to "retry".
skip:
... subsequent code beyond read/modify/write sequence
```

A challenge with these operations is that when multiple PEs all contend for the same operation concurrently, only one will succeed, so the remaining contenders will spin through many retries. An observation here is that after a CAS fails the PE will typically have the line in the unique (U) coherency state in its local cache 11, 12, 14; so if the PE can spin back through the retry loop to the same CAS without releasing the line from the unique coherency state, it is likely to make progress, and succeed on the subsequent attempt, under certain constraints.

Hence, by providing the hardware support for the processing circuitry 40 of a PE 9 to respond to a software-provided hint included in the sequence of instructions to be executed, indicating that a CAS is in one of these constrained retry loops, and that if it fails the target cache line (e.g. the line corresponding to address addrA in the example above) could be held in the local cache 50 in the unique coherency state for a period, until the same CAS is retried, this could allow the thread to more efficiently make progress while it has the line in the U state.

There are many ways that this could be achieved, e.g. the hint may want to simply annotate the opportunity, or it may want to elaborate on certain constraints e.g. it may specify a limited number of instructions by which it must re-try the failing CAS, or a specific control flow path (pattern of branch outcomes) to that CAS in order for the hint to be considered applicable. For example, the sequence above could be expanded to include the hint by encoding the hint using an earlier instruction preceding the CAS instruction:

```
   ldar x1, [addrA]
   retry:
   cmp x1, <0>
   ble <skip>
   mov x4, x1
   sub x2, x1, #1
   hint <#cas_hold_on_fail>
   // could optionally add branch outcome constraints (e.g.
      Taken, //NotTaken), and/or instruction limits (e.g. 8).
   casal x1, x2, [addrA]
   cmp x1, x4
   bne <retry>
   skip:
   . . .
```

This sort of hint could be used for a broad range of "composite operation single-word atomics", and cover many idioms for near-atomic sequences. Note this is a hint and can be safely ignored by the hardware. The sequences it will cover are already functionally correct, this is simply a performance hint. Hence, the hardware could apply other conditions which govern whether the hint is actually followed to prevent the U state of the target cache line addrA being relinquished in the retention period following the CAS instruction (conditional write instruction).

In addition, it may be possible to use an identity CAS to provide this hint, without requiring a specific hint (i.e. give the architecture definition of the identity CAS an additional meaning). When there is likely to be contention, the above code sequence can be written as follows:

```
casa x1, x1, [addrA]
retry:
cmp x1, <0>
ble <skip>
mov x4, x1
sub x2, x1, #1
hint <#cas_hold_on_fail> // could add branch constraints
    (e.g. Taken, NotTaken), and instruction limits (e.g. 8).
casal x1, x2, [addrA]
cmp x1, x4
bne <retry>
skip:
```

In the above sequence the original ldar instruction is replaced by a cas where both the compare operand register and the swap operand register are the same register-we call this an identity CAS. This is an unusual way to use a CAS because we are effectively making the compare redundant-only if the value in memory is the same as the value in the register do we set the value in memory to the value in the register (i.e. to the same value); in almost all scenarios software developers would not use a cas like this. However, it is a useful trick to bring the line into the cache in a unique coherency state; and if we can hold this unique coherency state until the subsequent CAS instruction then we should make forward progress.

Therefore, in some implementations, an identity CAS could be treated as an instruction expressing the cache-line-retention hint information.

In other examples, the cache-line-retention hint information could be encoded using a dedicated hint instruction (which other than providing the hint behaves as an architectural NOP), or using the CAS instruction itself (e.g. by providing hinting and non-hinting variants of the CAS instruction which trigger the same functional CAS operation but for which the hinting variant indicates presence of the hint and the non-hinting variant does not, or by encoding the hint in unused bits of a register used to encode the address operand for determining the target address addrA).

Figure 3:
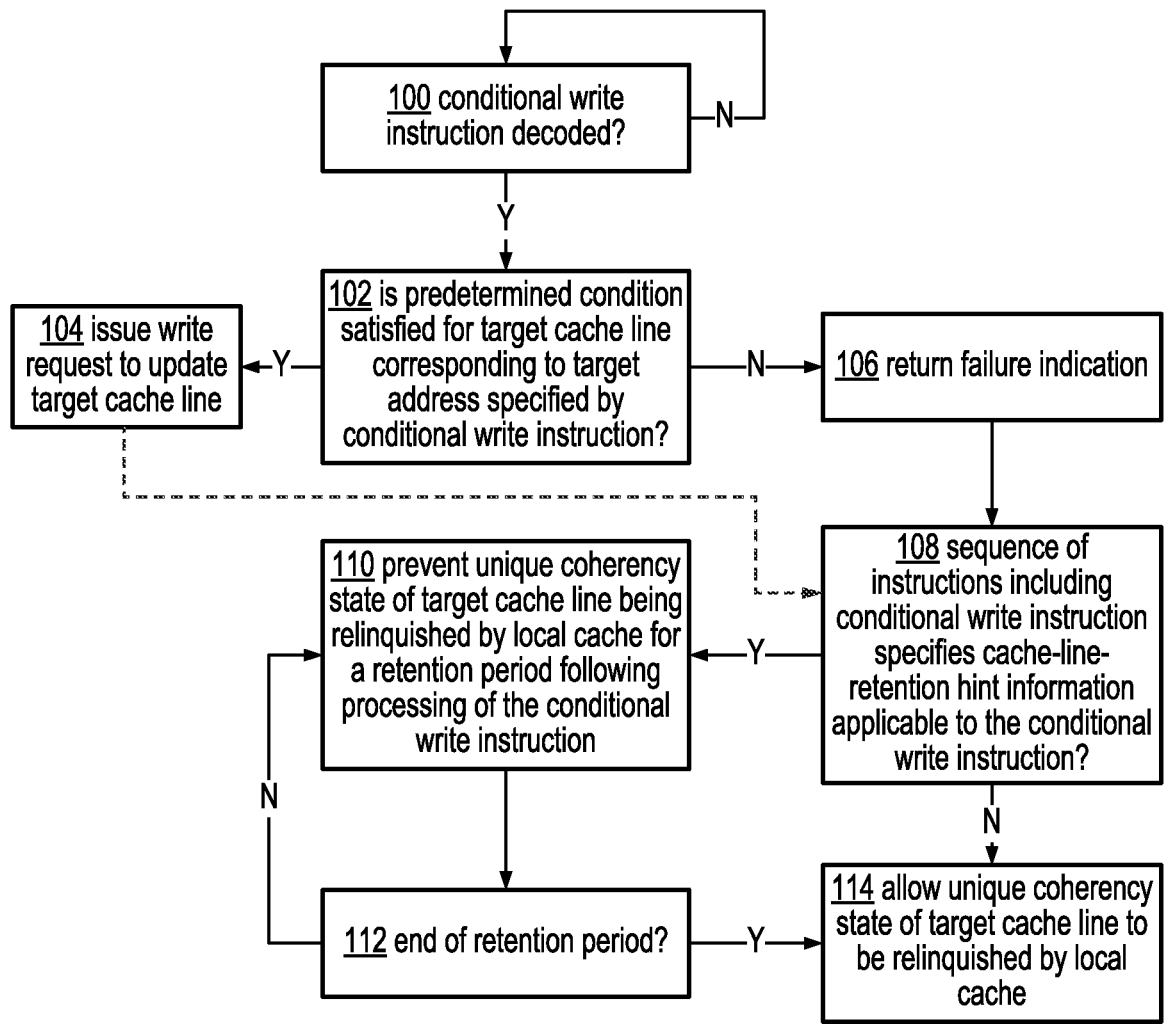
FIG. 3 is a flow diagram illustrating a method of processing a conditional write instruction, with cache-line-retention hint information being used to determine whether to prevent a unique coherency state of a target cache line being relinquished by a local cache during a retention period following processing of the conditional write instruction.

FIG. 3 is a flow diagram illustrating processing of the conditional write instruction (e.g. the CAS instruction mentioned above). In response to a conditional write instruction being decoded by the instruction decoder 40 at step 100, at step 102 the processing circuitry 42 determines whether a predetermined condition is satisfied for a target cache line corresponding to a target address specified by the conditional write instruction. For example, where the conditional write instruction is the CAS instruction, the predetermined condition may be considered satisfied if a comparison between a compare operand and a value loaded for the target cache line satisfies a particular comparison condition (e.g. the comparison condition could be to require that the compare operand equals the value loaded for the target cache line). If the predetermined condition is satisfied, then at step 104 write request is issued to update the target cache line (e.g. for the CAS instruction, with the swap operand being written to the target cache line). In some examples, on a successful write, at step 104 the processing circuitry 42 may also return a success indication which indicates whether the write succeeded.

If the predetermined condition is determined not to be satisfied, then at step 106 a failure indication is returned by the processing circuitry 42. For example, the failure indication could be setting of a general purpose register to a particular value, or could be setting condition status codes (which may be used to control evaluation of conditions governing execution of other conditional operations such as conditional compare operations) to a particular condition status value. Also, in the example shown in the sequences above, the failure indication could simply comprise the loaded value from the target cache line itself. E.g. in the example above the loaded value is written to the destination register x1, so a subsequent comparison instruction can then compare this value against an expected value (x4 in the example above) to deduce whether the conditional write would have been successful or not. Hence, the failure indication could be represented in a number of different ways, but in general an indication is provided which would allow a subsequent instruction to evaluate whether the write was successful, so that if the write was unsuccessful then a conditional branch can loop back to retry the sequence again.

At least if the predetermined condition was not satisfied at step 102 (and, as shown in the dotted line, in some implementations, also if the predetermined condition was satisfied), at step 108, the processing circuitry 42 determines whether the sequence of instructions including the conditional write instruction specifies cache-line-retention hint information applicable to the conditional write instruction. This determination could be based on whether the conditional write instruction itself encodes the cache-line-retention hint information, or whether an earlier instruction preceding the conditional write instruction provides the cache-line-retention hint information while the hint is still applicable to the conditional write instruction.

If the sequence of instructions is detected as specifying the cache-line-retention hint information, then at step 110, the processing circuitry 42 prevents any unique coherency state of the target cache line being relinquished by a local cache 11, 12, 14 associated with the processing circuitry 42 for a retention period following processing of the conditional write instruction. The target cache line can be prevented from relinquishing its unique coherency state, by not responding to snoop requests relating to the target cache line that are received from the coherent interconnect 10 during the retention period. At step 112, the processing circuitry 42 determines whether the retention period has ended yet, and if not continues to prevent relinquishment of the unique coherency state. The end of the retention period may occur upon expiry of a hardware timeout event (which could be set to expire either a fixed duration or a variable duration after processing of the conditional write instruction), or on occurrence of a retention period reset event, such as an exception being taken, another conditional write instruction successfully completing its write, another conditional write instruction being encountered which targets a different cache line to the target cache line, or the target cache line being evicted from the cache for reasons other than a snoop request being received from the coherent interconnect 10 (e.g. due to cache capacity conflict meaning that the processing circuitry 42 requires the cache entry 52 used for the target cache line to be reallocated to a different address).

Once a retention period is determined to have ended at step 112, then at step 114 the processing circuitry 42 can once more allow the unique coherency state of the target cache line to be relinquished by its local cache 11, 12, 14 (although this does not necessarily mean that the unique coherency state will immediately be relinquished—if there are no snoops triggered by other requesters trying to access the same cache line or there is no need for a capacity based eviction of the target cache line from the local cache 11, 12, 14, the unique coherency state may persist for a time beyond the end of the retention period).

On the other hand, if at step 108 the sequence of instructions was detected as not specifying any cache-line-retention hint information, then steps 110 and 112 are omitted, and the method proceeds to step 114 to allow the local cache 11, 12, 14 to relinquish the unique coherency state (if required based on a snoop from the interconnect 10), even if the retention period would not have expired yet.

Hence, with this approach software can provide hints which may express whether it is likely to be beneficial to try to retain the line in a unique coherency state for a period beyond a failed conditional write instruction, which can increase the likelihood that the thread including the failed conditional write instruction can make forward progress, improving performance.

The dashed line from step 104 to step 108 represents the option that, although a benefit of use of the hint (to trigger enforced retention of the unique coherency state during the retention period after the conditional write) can be greatest following a failed conditional write that failed its predetermined condition, in some scenarios the retention could also be enforced following a successful conditional write. For example, in the implementation where the hint is encoded as an identity CAS, that identity CAS is itself detected as a conditional write instruction associated with a predetermined condition (e.g. condition of whether the compare operand equals the swap operand), and the predetermined condition (whether a value loaded from memory for the target address is equal to the compare operand) could sometimes be satisfied for an identity CAS. However, as the main function of the identity CAS is to act as the hint and "prime" the cache to load the target cache line in advance of a later conditional write instruction (e.g. a "true" CAS with a compare operand different to the swap operand), it can be beneficial that even if the predetermined condition is satisfied for the identity CAS, the identity CAS is treated as a conditional write instruction with applicable hint information and so causes prevention of the unique coherency state of the target cache line from being relinquished during a retention period after the identity CAS, as shown at step 110 of FIG. 3.

While FIG. 3 shows an approach where the presence of the hint causes the processing circuitry 42 to resist giving up the unique coherency state for the target cache line during the retention period (and the absence of the hint means there is no need to resist giving up the unique coherency state), in other examples the implementation could be the other way round, so that the default behaviour (in absence of the hint) is to perform steps 110, 112 to resist giving up unique coherency state for the target cache line during the retention period, while if a hint is provided by software then the processing circuitry 42 at step 114 does not resist attempts to remove the unique coherency state for the target cache line in the local cache 11, 12, 14.

Figure 4:
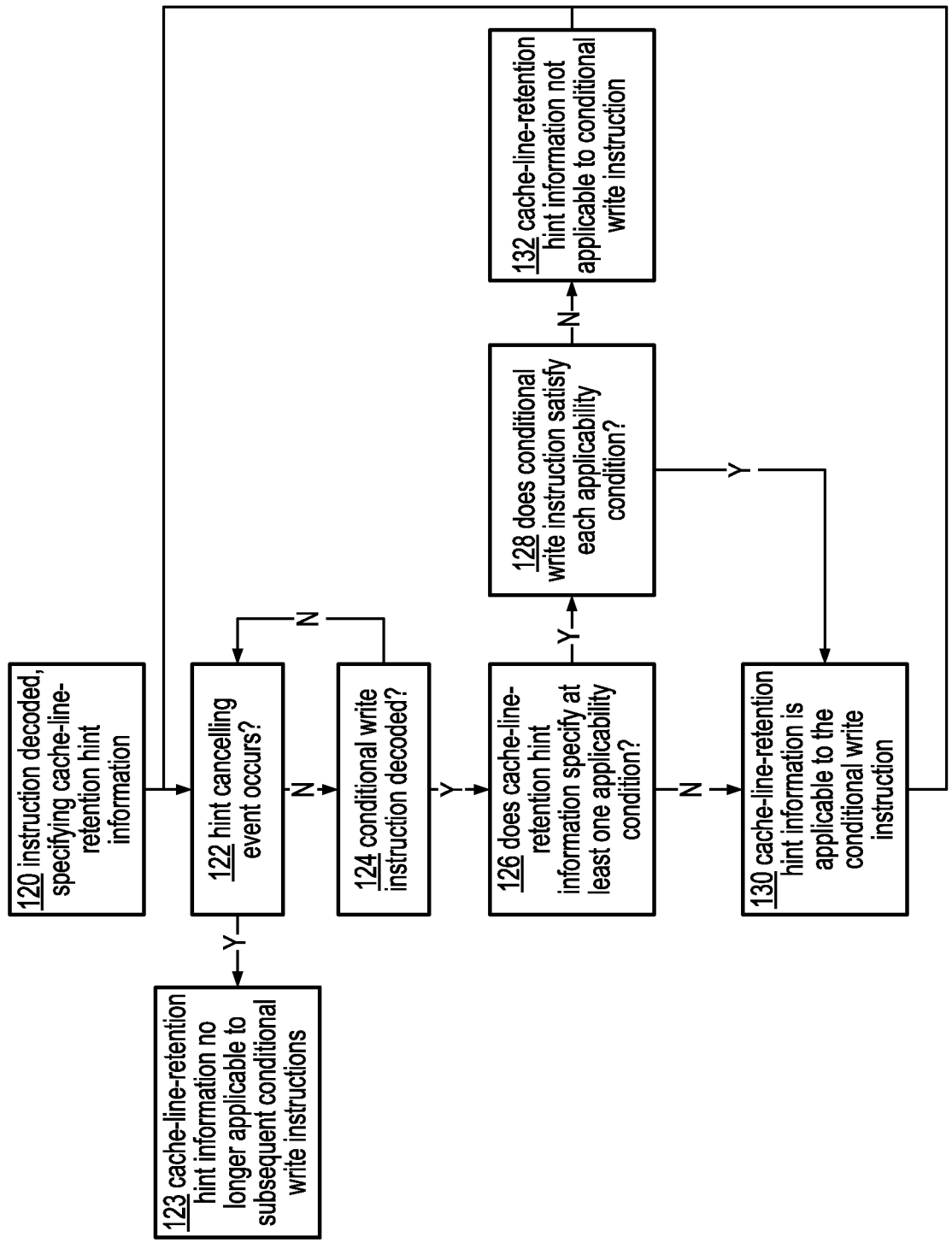
FIG. 4 is a flow diagram illustrating an example for determining whether the cache-line-retention hint information is applicable to a conditional write instruction.

FIG. 4 is a flow diagram showing in more detail an example of how the processing circuitry 42 may determine whether cache-line-retention hint information specified by an earlier instruction than a conditional write instruction is still applicable when a subsequent conditional write instruction is encountered. At step 120 an instruction is decoded by the instruction decoding circuitry 40, which specifies cache-line-retention hint information. Hence, a period of applicability of the hint information begins.

At step 122, the processing circuitry 42 determines whether any hint cancelling event has occurred. For example, the hint cancelling event can be any of: an exception being taken; the predetermined condition being determined to be satisfied for a subsequent conditional write instruction; detection of a change in the target cache line specified between one conditional write instruction and another; eviction of the target cache line from the local cache; or a hardware counter timeout event (e.g. elapse of a given number of processing cycles, executed or committed instructions or load/store operations since the instruction specifying the hint was encountered). If the hint cancelling event occurs, then at step 123 the processing circuitry 42 determines that the cache-line-retention hint information is no longer applicable to subsequent conditional write instructions. Otherwise, the hint information may remain applicable.

If no hint cancelling event has occurred yet, and also no conditional write instruction has been decoded yet (step 124), the processing circuitry 42 awaits either a hint cancelling event or a conditional write instruction being decoded.

When a conditional write instruction is decoded at step 124 (without any intervening instance of a hint cancelling event having occurred since the cache-line-retention hint information was detected at step 120), then at step 126 the processing circuitry 42 determines whether the cache-line-retention hint information specifies at least one applicability condition governing whether the hint is applicable to a particular instance of the conditional write instruction. If there are no specific applicability conditions defined by the hint, then as no hint cancelling event has occurred yet at step 130 the processing circuitry 42 determines that the cache-line-retention hint information is applicable to the conditional write instruction.

Alternatively, if the cache-line-retention hint information does specify at least one applicability condition, then at step 128 the processing circuitry 42 determines whether the conditional write instruction satisfies each applicability condition specified by the cache-line-retention hint information. For example, the processing circuitry 42 could determine whether a distance between the instruction specifying the hint information and the conditional write instruction is no more than a certain maximum number of instructions, or whether a pattern of branch outcomes of one or more branches leading up to the conditional write instruction meets certain expected patterns of taken/not-taken outcomes. If each applicability condition is satisfied by the conditional write instruction, then again at step 130 the cache-line-retention hint information is considered to be applicable to conditional write instruction. If any required applicability condition is not satisfied, then at step 132 the processing circuitry 42 determines that the cache-line-retention hint information is not applicable to this particular conditional write instruction (although if the hint cancelling event has not occurred yet, this does not rule out the possibility that the hint may later be applicable to a different instance of a conditional write instruction).

Following step 130 or step 132, the method returns to step 122 to await either a hint cancelling event or a further instance of a conditional write instruction. Once a hint cancelling event has occurred, the hint detected at step 120 is no longer applicable to subsequent conditional write instructions.

In some examples, other applicability conditions could also be applied for determining whether the hint is applicable to the conditional write instruction. This can include one or more applicability conditions not explicitly specified by the hint information. For example, for cases where the conditional write instruction is a true CAS (having the compare operand different to the swap operand), an applicability condition may be that the predetermined condition is not satisfied for the true CAS. This would tend to improve performance by reducing the likelihood that after a successful CAS which managed to carry out its write operation, other requesters are unnecessarily prevented from making progress because the hint associated with the successful CAS is causing the local cache to block release of the unique coherency status for the target cache line.

Figure 5:
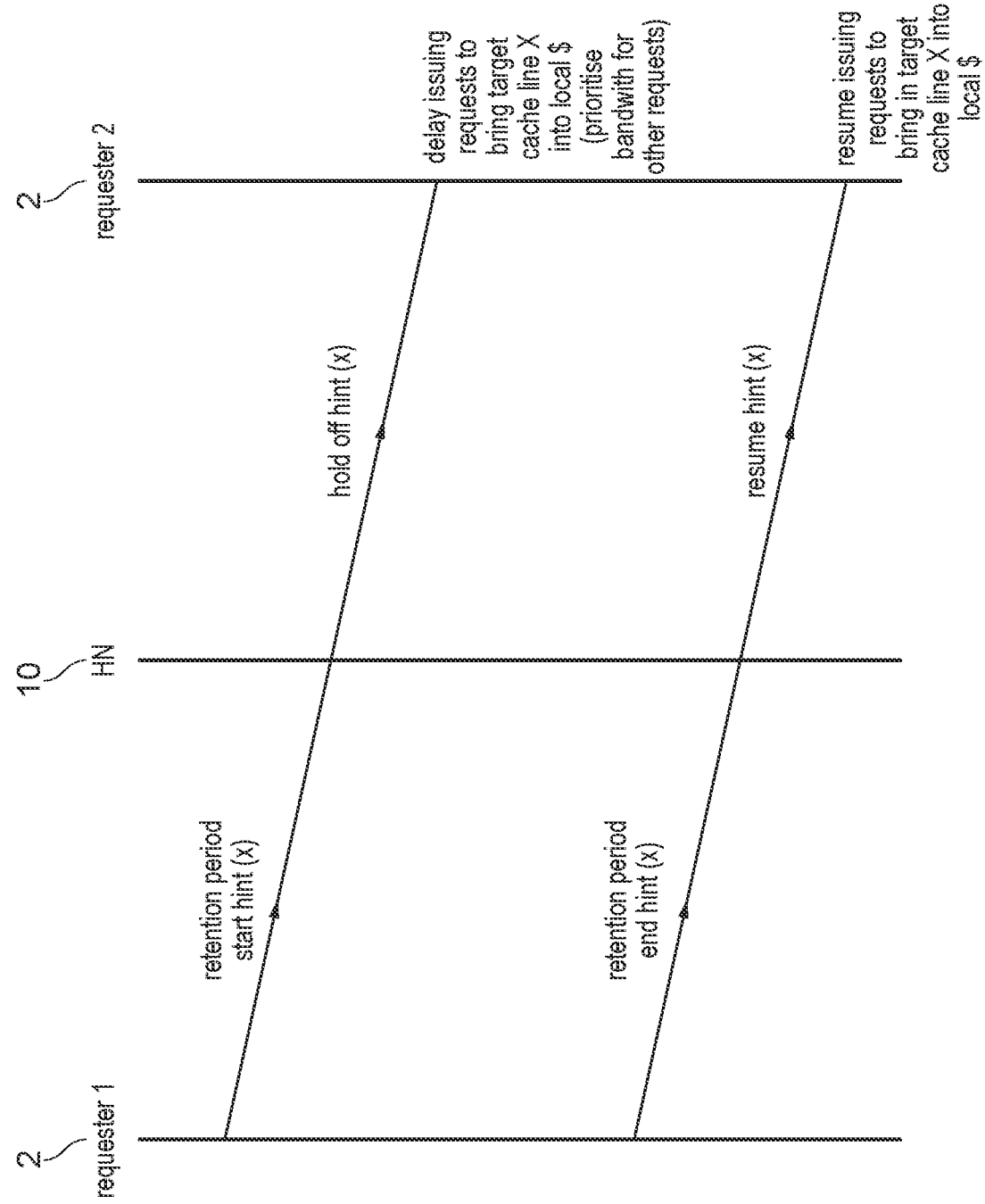
FIG. 5 illustrates an example of signalling to coherency control circuitry an indication of whether the local cache would relinquish the unique coherency state for a given cache line.

As shown in FIG. 5, in some examples it can be useful for the processing circuitry 42, based on the cache-line-retention hint information, to pass information out to the system (e.g. to the coherency control circuitry at the interconnect 10—the coherency control circuitry can also be referred to as a home node or "HN"), to indicate whether a particular local cache 11, 12, 14 is likely to be resisting attempts to cause that local cache 11, 12, 14 to relinquish the unique coherency state. For example, FIG. 5 shows an example where two CPUs 2 each associated with respective local caches subject to a coherency protocol are trying to access the same cache line X using read/modify/write sequences as shown above. When requester 1 enters the retention period in which it will resist attempts to cause its local cache to relinquish the unique coherency state of the cache line, the processing circuitry 42 in requester 1 signals a retention period start hint signal to the coherency control circuitry 10, identifying that the retention period has started. Similarly, once the retention period ends, a retention period end signal may be communicated by the processing circuitry 42 in requester 1 to the coherency control circuitry 10. The response taken by the coherency control circuitry 10 to those hint signals can vary, but in one example as shown in FIG. 5 the coherency control circuitry 10 may signal to requester 2 that, while requester 1 is in its retention period, requester 2 could delay issuing requests to bring target cache line X into its local cache, and prioritise use of any memory request bandwidth for requests to other addresses. For example, a "hold off" hint specifying the address of target cache line X may be sent by coherency control circuitry 10 to requester 2 in response to the retention period start hint, and a "resume" hint specifying the address of target cache line X may be sent by coherency control circuitry 10 to requester 2 in response to the retention period end hint being received from requester 1. This can help improve performance because, by causing requester 2 to defer issuing requests which cannot make progress, such requesters to cache line X will not occupy buffer slots in buffer structures at the coherency control circuitry 10, so that it is less likely that other requests are blocked because the coherency control circuitry 10 runs out of buffer capacity to buffer pending requests.

Alternatively, while not shown in FIG. 5, another option could be that requester 2 could issue requests to bring target cache line X into its local cache nonetheless, but these requests may be buffered for a time in the coherency control circuitry 10 and not passed to requester 1 when the coherency control circuitry 10 knows the requester 1 is in the retention period for target cache line X. Again, this may allow the coherency control circuitry 10 to prioritise its own internal operations to favour other operations which relate to other cache lines in the retention period when it knows that no progress can be made with snoop requests for target cache line X. Hence, providing hints to the system interconnect 10 during the retention period can enable more efficient system operations for other elements of the system (such as home node 10 and requester 2).

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. An apparatus comprising:
    instruction decoding circuitry to decode a sequence of instructions; and
    processing circuitry to perform data processing in response to decoding of the sequence of instructions by the instruction decoding circuitry; in which:
    in response to the instruction decoding circuitry decoding a conditional write instruction, the processing circuitry is configured to:
        determine whether a predetermined condition is satisfied for a target cache line corresponding to a target address specified by the conditional write instruction;
        in response to determining that the predetermined condition is satisfied for the target cache line, issue a write request to update the target cache line; and
        in response to determining that the predetermined condition is not satisfied for the target cache line, return a failure indication; and
        select, depending on whether the sequence of instructions specifies cache-line-retention hint information applicable to the conditional write instruction, whether to prevent a unique coherency state of the target cache line being relinquished by a local cache associated with the processing circuitry for a retention period following processing of the conditional write instruction, the unique coherency state comprising a coherency state in which the processing circuitry has exclusive right to update the target cache line.

2. The apparatus according to clause 1, in which the conditional write instruction comprises a compare-and-swap instruction specifying the target address, a compare operand and a swap operand;
    the processing circuitry is configured to determine whether the predetermined condition is satisfied based on a comparison of the compare operand with a value loaded for the target cache line; and
    in response to determining that the predetermined condition is satisfied, the processing circuitry is configured to issue the write request to write the swap operand to the target cache line.

3. The apparatus according to claim 2, in which, at least when the conditional write instruction comprises the compare-and-swap instruction for which the compare operand differs from the swap operand, the processing circuitry is configured to determine that the cache-line-retention hint information is applicable to the conditional write instruction when the predetermined condition is not satisfied for the conditional write instruction, but determine that the cache-line-retention hint information is not applicable to the conditional write instruction when the predetermined condition is satisfied for the conditional write instruction.

4. The apparatus according to any of clauses 1 to 3, in which during the retention period, the processing circuitry is configured to prevent the unique coherency state of the target cache line being relinquished by delaying responding to snoop requests relating to the target cache line until after the end of the retention period.

5. The apparatus according to any of clauses 1 to 4, in which at least one of the instruction decoding circuitry and the processing circuitry is configured to detect whether the sequence of instructions specifies the cache-line-retention hint information based on whether the conditional write instruction specifies the cache-line-retention hint information.

6. The apparatus according to any of clauses 1 to 4, in which at least one of the instruction decoding circuitry and the processing circuitry is configured to detect whether the sequence of instructions specifies the cache-line-retention hint information based on whether an earlier instruction than the conditional write instruction specifies the cache-line-retention hint information.

7. The apparatus according to clause 6, in which:
    in response to decoding of a compare-and-swap instruction specifying a given address, a compare operand and a swap operand, the processing circuitry is configured to compare the compare operand with a value loaded for a given cache line corresponding to the given address, and in response to determining that a comparison condition is satisfied, write the swap operand to a given cache line corresponding to the given address; and
    the earlier instruction comprises an instance of the compare-and-swap instruction for which the compare operand equals the swap operand.

8. The apparatus according to any of clauses 6 and 7, in which the cache-line-retention hint information is applicable to the conditional write instruction when the earlier instruction specifies the cache-line-retention hint information and no instance of a hint-cancelling event has occurred between the earlier instruction and the conditional write instruction.

9. The apparatus according to clause 8, in which the hint-cancelling event comprises one of:
    an exception being taken;
    the predetermined condition being determined to be satisfied for another conditional write instruction occurring between the earlier instruction and the conditional write instruction;
    another conditional write instruction being detected as specifying an address of a different cache line to the target cache line;
    eviction of the target cache line from the local cache; or
    a hardware counter timeout event.

10. The apparatus according to any of clauses 1 to 9, in which the processing circuitry is configured to determine whether the cache-line-retention hint information is applicable to the conditional write instruction depending on whether at least one applicability condition specified by the cache-line-retention hint information is satisfied for the conditional write instruction.

11. The apparatus according to clause 10, in which the at least one applicability condition specifies a threshold number of intervening instructions; and
    the processing circuitry is configured to determine that the cache-line-retention hint information is not applicable to the conditional write instruction when a number of intervening instructions between an earlier instruction specifying the cache-line-retention hint information and the conditional write instruction is greater than the threshold number.

12. The apparatus according to any of clauses 10 and 11, in which the at least one applicability condition specifies at least one branch outcome condition; and the processing circuitry is configured to determine that the cache-line-retention hint information is not applicable to the conditional write instruction when a pattern of branch outcomes of one or more branch instructions preceding the conditional write instruction fail to satisfy the at least one branch outcome condition.

13. The apparatus according to any of clauses 1 to 12, in which the processing circuitry is configured to end the retention period in response to a hardware counter timeout event occurring after processing of the conditional write instruction.

14. The apparatus according to any of clauses 1 to 13, in which the processing circuitry is configured to end the retention period after elapse of a period of variable duration selected based on retention period duration information specified by the cache-line-retention hint information.

15. The apparatus according to any of clauses 1 to 14, in which the processing circuitry is configured to end the retention period in response to occurrence of a retention period reset event.

16. The apparatus according to clause 15, in which the retention period reset event comprises one of:
an exception being taken;
the predetermined condition being determined to be satisfied for another conditional write instruction occurring after the conditional write instruction;
another conditional write instruction being detected as specifying an address of a different cache line to the target cache line;
eviction of the target cache line from the local cache; or
a hardware counter timeout event.

17. The apparatus according to any of clauses 1 to 16, in which the processing circuitry is configured to provide a retention hint signal to coherency control circuitry responsible for managing coherency between the local cache and a further cache, the retention hint signal indicating that the local cache would not relinquish the unique coherency state during the retention period.

18. Computer-readable code for fabrication of an apparatus comprising:
instruction decoding circuitry to decode a sequence of instructions; and
processing circuitry to perform data processing in response to decoding of the sequence of instructions by the instruction decoding circuitry; in which:
in response to the instruction decoding circuitry decoding a conditional write instruction, the processing circuitry is configured to:
determine whether a predetermined condition is satisfied for a target cache line corresponding to a target address specified by the conditional write instruction;
in response to determining that the predetermined condition is satisfied for the target cache line, issue a write request to update the target cache line; and
in response to determining that the predetermined condition is not satisfied for the target cache line, return a failure indication; and
select, depending on whether the sequence of instructions specifies cache-line-retention hint information applicable to the conditional write instruction, whether to prevent a unique coherency state of the target cache line being relinquished by a local cache associated with the processing circuitry for a retention period following processing of the conditional write instruction, the unique coherency state comprising a coherency state in which the processing circuitry has exclusive right to update the target cache line.

19. A storage medium storing the computer-readable code according to clause 18.

20. A method comprising:
decoding a sequence of instructions; and
in response to decoding of the sequence of instructions, performing data processing using processing circuitry; in which:
in response to decoding of a conditional write instruction, the data processing comprises:
determining whether a predetermined condition is satisfied for a target cache line corresponding to a target address specified by the conditional write instruction;
in response to determining that the predetermined condition is satisfied for the target cache line, issuing a write request to update the target cache line; and
in response to determining that the predetermined condition is not satisfied for the target cache line, returning a failure indication; and
selecting, depending on whether the sequence of instructions specifies cache-line-retention hint information applicable to the conditional write instruction, whether to prevent a unique coherency state of the target cache line being relinquished by a local cache associated with the processing circuitry for a retention period following processing of the conditional write instruction, the unique coherency state comprising a coherency state in which the processing circuitry has exclusive right to update the target cache line.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
   instruction decoding circuitry to decode a sequence of instructions; and
   processing circuitry to perform data processing in response to decoding of the sequence of instructions by the instruction decoding circuitry; in which:
   in response to the instruction decoding circuitry decoding a conditional write instruction, the processing circuitry is configured to:
      determine whether a predetermined condition is satisfied for a target cache line corresponding to a target address specified by the conditional write instruction;
      in response to determining that the predetermined condition is satisfied for the target cache line, issue a write request to update the target cache line; and
      in response to determining that the predetermined condition is not satisfied for the target cache line, return a failure indication; and
      select, depending on whether the sequence of instructions specifies cache-line-retention hint information applicable to the conditional write instruction, whether to prevent a unique coherency state of the target cache line being relinquished by a local cache associated with the processing circuitry for a retention period following processing of the conditional write instruction, the unique coherency state comprising a coherency state in which the processing circuitry has exclusive right to update the target cache line.

2. The apparatus according to claim 1, in which the conditional write instruction comprises a compare-and-swap instruction specifying the target address, a compare operand and a swap operand;
   the processing circuitry is configured to determine whether the predetermined condition is satisfied based on a comparison of the compare operand with a value loaded for the target cache line; and
   in response to determining that the predetermined condition is satisfied, the processing circuitry is configured to issue the write request to write the swap operand to the target cache line.

3. The apparatus according to claim 2, in which, at least when the conditional write instruction comprises the compare-and-swap instruction for which the compare operand differs from the swap operand, the processing circuitry is configured to determine that the cache-line-retention hint information is applicable to the conditional write instruction when the predetermined condition is not satisfied for the conditional write instruction, but determine that the cache-line-retention hint information is not applicable to the conditional write instruction when the predetermined condition is satisfied for the conditional write instruction.

4. The apparatus according to claim 1, in which during the retention period, the processing circuitry is configured to prevent the unique coherency state of the target cache line being relinquished by delaying responding to snoop requests relating to the target cache line until after the end of the retention period.

5. The apparatus according to claim 1, in which at least one of the instruction decoding circuitry and the processing circuitry is configured to detect whether the sequence of instructions specifies the cache-line-retention hint information based on whether the conditional write instruction specifies the cache-line-retention hint information.

6. The apparatus according to claim 1, in which at least one of the instruction decoding circuitry and the processing circuitry is configured to detect whether the sequence of instructions specifies the cache-line-retention hint information based on whether an earlier instruction than the conditional write instruction specifies the cache-line-retention hint information.

7. The apparatus according to claim 6, in which:
   in response to decoding of a compare-and-swap instruction specifying a given address, a compare operand and a swap operand, the processing circuitry is configured to compare the compare operand with a value loaded for a given cache line corresponding to the given address, and in response to determining that a comparison condition is satisfied, write the swap operand to a given cache line corresponding to the given address; and
   the earlier instruction comprises an instance of the compare-and-swap instruction for which the compare operand equals the swap operand.

8. The apparatus according to claim 7, in which the cache-line-retention hint information is applicable to the conditional write instruction when the earlier instruction specifies the cache-line-retention hint information and no instance of a hint-cancelling event has occurred between the earlier instruction and the conditional write instruction.

9. The apparatus according to claim 8, in which the hint-cancelling event comprises one of:
   an exception being taken;
   the predetermined condition being determined to be satisfied for another conditional write instruction occurring between the earlier instruction and the conditional write instruction;
   another conditional write instruction being detected as specifying an address of a different cache line to the target cache line;
   eviction of the target cache line from the local cache; or
   a hardware counter timeout event.

10. The apparatus according to claim 1, in which the processing circuitry is configured to determine whether the cache-line-retention hint information is applicable to the conditional write instruction depending on whether at least one applicability condition specified by the cache-line-retention hint information is satisfied for the conditional write instruction.

11. The apparatus according to claim 10, in which the at least one applicability condition specifies a threshold number of intervening instructions; and
   the processing circuitry is configured to determine that the cache-line-retention hint information is not applicable to the conditional write instruction when a number of intervening instructions between an earlier instruction specifying the cache-line-retention hint information and the conditional write instruction is greater than the threshold number.

12. The apparatus according to claim 10, in which the at least one applicability condition specifies at least one branch outcome condition; and
   the processing circuitry is configured to determine that the cache-line-retention hint information is not applicable to the conditional write instruction when a pattern of branch outcomes of one or more branch instructions preceding the conditional write instruction fail to satisfy the at least one branch outcome condition.

13. The apparatus according to claim 1, in which the processing circuitry is configured to end the retention period in response to a hardware counter timeout event occurring after processing of the conditional write instruction.

14. The apparatus according to claim 1, in which the processing circuitry is configured to end the retention period after elapse of a period of variable duration selected based on retention period duration information specified by the cache-line-retention hint information.

15. The apparatus according to claim 1, in which the processing circuitry is configured to end the retention period in response to occurrence of a retention period reset event.

16. The apparatus according to claim 15, in which the retention period reset event comprises one of:
   an exception being taken;
   the predetermined condition being determined to be satisfied for another conditional write instruction occurring after the conditional write instruction;
   another conditional write instruction being detected as specifying an address of a different cache line to the target cache line;
   eviction of the target cache line from the local cache; or
   a hardware counter timeout event.

17. The apparatus according to claim 1, in which the processing circuitry is configured to provide a retention hint signal to coherency control circuitry responsible for managing coherency between the local cache and a further cache, the retention hint signal indicating that the local cache would not relinquish the unique coherency state during the retention period.

18. A non-transitory computer-readable medium to store computer-readable code for fabrication of an apparatus comprising:
   instruction decoding circuitry to decode a sequence of instructions; and
   processing circuitry to perform data processing in response to decoding of the sequence of instructions by the instruction decoding circuitry; in which:
   in response to the instruction decoding circuitry decoding a conditional write instruction, the processing circuitry is configured to:
      determine whether a predetermined condition is satisfied for a target cache line corresponding to a target address specified by the conditional write instruction;
      in response to determining that the predetermined condition is satisfied for the target cache line, issue a write request to update the target cache line; and
      in response to determining that the predetermined condition is not satisfied for the target cache line, return a failure indication; and
   select, depending on whether the sequence of instructions specifies cache-line-retention hint information applicable to the conditional write instruction, whether to prevent a unique coherency state of the target cache line being relinquished by a local cache associated with the processing circuitry for a retention period following processing of the conditional write instruction, the unique coherency state comprising a coherency state in which the processing circuitry has exclusive right to update the target cache line.

19. A method comprising:
   decoding a sequence of instructions; and
   in response to decoding of the sequence of instructions, performing data processing using processing circuitry; in which:
   in response to decoding of a conditional write instruction, the data processing comprises:
      determining whether a predetermined condition is satisfied for a target cache line corresponding to a target address specified by the conditional write instruction;
      in response to determining that the predetermined condition is satisfied for the target cache line, issuing a write request to update the target cache line; and
      in response to determining that the predetermined condition is not satisfied for the target cache line, returning a failure indication; and
   selecting, depending on whether the sequence of instructions specifies cache-line-retention hint information applicable to the conditional write instruction, whether to prevent a unique coherency state of the target cache line being relinquished by a local cache associated with the processing circuitry for a retention period following processing of the conditional write instruction, the unique coherency state comprising a coherency state in which the processing circuitry has exclusive right to update the target cache line.

* * * * *